United States Patent [19]

Toyosawa et al.

[11] Patent Number: 4,939,050
[45] Date of Patent: Jul. 3, 1990

[54] ELECTRIC CELLS

[75] Inventors: Shinichi Toyosawa, Tokorozawa; Isamu Shinoda, Sendai; Katsuhiko Arai, Iruma; Toyoo Harada, Sendai; Yuko Maeda; Hideharu Daifuku, both of Akishima; Shigeru Kijima, Tokorozawa; Kinya Suzuki, Kodaira; Yoshitomo Masuda, Tachikawa; Masao Ogawa, Kawagoe; Takahiro Kawagoe, Tokorozawa; Tadashi Fuse, Kodaira; Tetsuro Amano, Tokyo, all of Japan

[73] Assignees: Bridgestone Corporation, Tokyo; Seiko Electronic Components, Ltd., Sendai, both of Japan

[21] Appl. No.: 269,449

[22] Filed: Nov. 10, 1988

[30] Foreign Application Priority Data

| Nov. 12, 1987 | [JP] | Japan | 62-286000 |
| Dec. 7, 1987 | [JP] | Japan | 62-309275 |
| Jan. 21, 1988 | [JP] | Japan | 63-011240 |
| Feb. 23, 1988 | [JP] | Japan | 63-040465 |
| Mar. 23, 1988 | [JP] | Japan | 63-068869 |
| Apr. 5, 1988 | [JP] | Japan | 63-083660 |
| Jun. 7, 1988 | [JP] | Japan | 63-138307 |

[51] Int. Cl.$^5$ .................... H01M 4/70; H01M 2/12
[52] U.S. Cl. ........................... 429/241; 429/56; 429/213; 429/245
[58] Field of Search ............... 429/53, 56, 72, 213, 429/241, 245

[56] References Cited

U.S. PATENT DOCUMENTS

| 3,741,812 | 6/1973 | Spellman et al. | 429/53 |
| 4,533,609 | 8/1985 | Dey et al. | 429/56 X |
| 4,581,304 | 4/1986 | Beatty et al. | 429/56 |
| 4,717,634 | 1/1988 | Daifuku et al. | 429/194 X |
| 4,824,745 | 4/1989 | Ogawa et al. | 429/213 |

Primary Examiner—Stephen J. Kalafut
Attorney, Agent, or Firm—Oblon, Spivak, McClelland, Maier & Neustadt

[57] ABSTRACT

An electric cell comprising a positive electrode, a negative electrode, and an electrolyte maintains excellent performance when the positive electrode is an electro-conductive polymer composite including a mesh stainless steel having a wire diameter of about 35–120 μm and an electro-conductive polymer, typically polyaniline, integrally deposited onto the mesh by electrolytic polymerization. A container having the elements received therein is provided with a vent mechanism.

12 Claims, 6 Drawing Sheets

FIG. 6
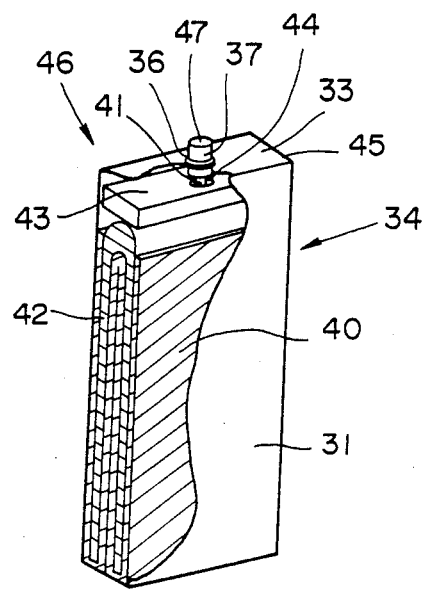
FIG. 7
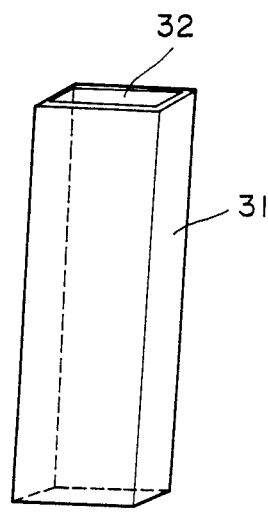
FIG. 8 (A)
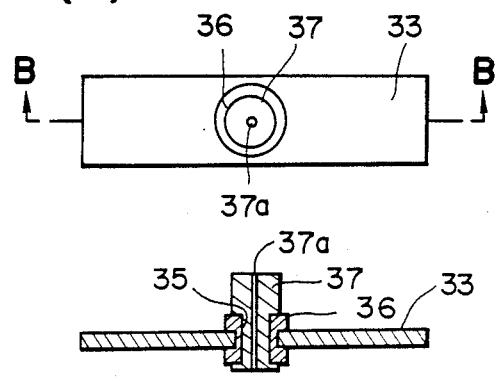
FIG. 8 (B)
FIG. 9
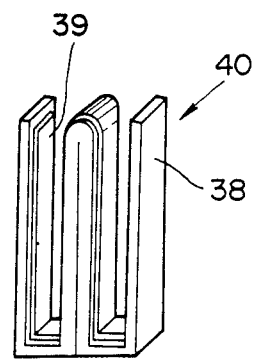

ELECTRIC CELLS

BACKGROUND OF THE INVENTION

This invention relates to an electric cell in which the positive electrode material is composed of an electroconductive polymer composite of stainless steel integrated with an electroconductive polymer.

Attempts were made in the prior art to use electroconductive polymers such as polyaniline, polypyrrole, polythiophen, polyacetylene, and poly-p-phenylene as electrode material for electric cells. Some are successful in producing commercially acceptable cells.

In constructing a cell using such a conductive polymer as the electrode material, a current collector is generally applied to the electrode. In order that the conductive polymer fully exert its function, the collector plays a great role. A careful choice must be made of the material, shape and contact of the collector.

As the collector for the conductive polymers, noble metals such as platinum and gold or carbonaceous materials are favorably used because of their stability and surface activity. However, noble metals such as platinum and gold are very expensive, leaving a cost problem. Carbonaceous materials are not regarded practical because they are less flexible and unreliable in strength.

On the contrary, the use of stainless steel as the collector is preferred because stainless steel is a commonly used material which is inexpensive and free of a strength problem. It is preferred to produce a conductive polymer such as polyaniline through electrolytic polymerization because the polymer is available in film form and an electrode used in electrolytic polymerization can be a collector as such. Stainless steel is generally used as the polymerization electrode in the form of a plate or foil. When a conductive polymer is deposited on a stainless steel substrate through electrolytic polymerization, the bond between the substrate and the deposit is insufficient. If a stainless steel substrate having a conductive polymer deposited thereon is used as the electrode without further processing, the polymer deposit tends to peel off or chip away from the substrate. It is thus difficult to obtain a flawless membrane material. Insufficent bond indicates that electrical contact is also insufficient. If such a conductive polymer composite is used to construct a cell in which the conductive polymer serves as an electrode active material and the stainless steel which has served as a polymerization electrode serves as a current collector, peeling or chipping of the conductive polymer or active material from the stainless steel or collector would often invite a loss of cell performance including a loss of collecting capacity and an increase of internal resistance of the collector.

SUMMARY OF THE INVENTION

An object of the present invention is to provide an electric cell having an electrode in the form of an active material integrated with a current collector, wherein the active material is an electroconductive polymer which is free of chipping or peeling from the associated collector so that the cell can maintain its performance over an extended period of time.

We attempted to deposit a conductive polymer such as polyaniline on various forms of polymerization electrodes by electrolytic polymerization. When the polymerization electrode is a mesh stainless steel having a specific wire diameter of 35 to 120 $\mu$m, preferably 40 to 100 $\mu$m, the conductive polymer is electrolytically deposited evenly on the mesh electrode to form a composite. The deposit of polymer is uniform in weight distribution over the area of the mesh electrode and excellent in film formation. It is observed that the mesh stainless steel is embedded in the conductive polymer layer while the conductive polymer is tightly bonded to the mesh stainless steel. Using the composite, a cell is constructed in which the conductive polymer forms an active material and the mesh stainless steel forms a collector for a positive electrode. The occurrence of peeling or chipping between the conductive polymer active material and the mesh stainless steel collector is minimized. Thus the cell maintains its performance high for an extended period of time.

According to the present invention, there is provided an electric cell comprising a positive electrode, a negative electrode, and an electrolyte, wherein the positive electrode is an electroconductive polymer composite including a mesh stainless steel having a wire diameter of about 35 to about 120 $\mu$m and an electroconductive polymer integrally deposited onto the mesh by electrolytic polymerization.

BRIEF DESCRIPTION OF THE DRAWINGS

The above and other objects, features, and advantages of the present invention will be better understood from the following description taken in conjunction with the accompanying drawings, in which:

FIG. 6 is a perspective view showing the cell fabricated in Example 10;

FIG. 7 is a perspective view showing a casing used in the cell of FIG. 6;

FIG. 8 shows a lid used in the cell of FIG. 6, FIG. 8A being a plan view and FIG. 8B being a cross section;

FIG. 9 is a perspective view showing a negative electrode used in the cell of FIG. 6;

DETAILED DESCRIPTION OF THE INVENTION

Figure 1:
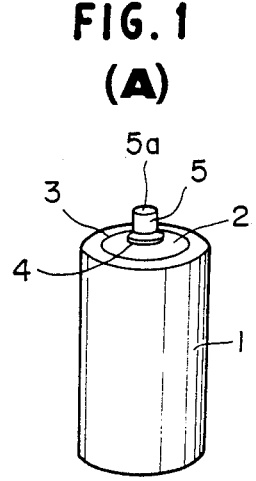
FIG. 1 is a perspective view showing consecutive steps of sealing a cell container by laser welding, FIG. 1A showing a first sealing step, FIG. 1B showing to admit electrolytic solution, and FIG. 1C showing a second sealing step.
Figure 1:
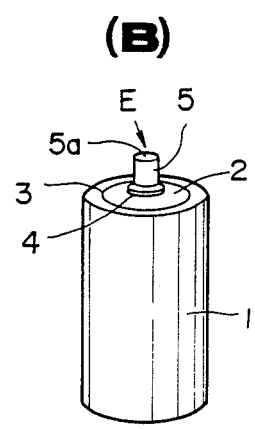
Figure 1:
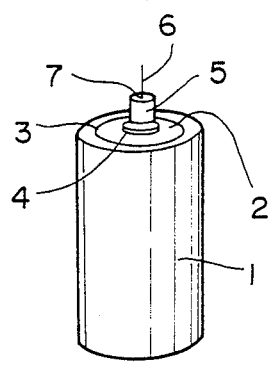

The cell of the present invention has a positive electrode which is a conductive polymer composite including a mesh stainless steel having a wire diameter of about 35 to about 120 μm and a conductive polymer integrally deposited onto the mesh by electrolytic polymerization. The term conductive means electroconductive unless stated otherwise, and the term polymer is equivalent to a high molecular weight substance.

The type of the conductive polymer used as the positive electrode active material is not particularly limited as long as it is produced by electrolytic polymerization. Examples of the conductive polymer include polyaniline, a mixture of polyaniline and a derivative thereof, polypyrrole, and polythiophene, with polyaniline and a mixture of polyaniline and a derivative thereof being preferred.

Examples of the polyaniline derivatives include those polymers produced by electrolytic polymerization of aniline derivatives having the formula:

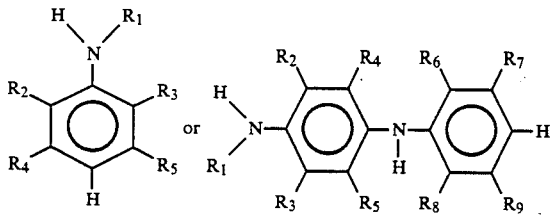

where $R_1$ through $R_9$ are independently selected from the group consisting of hydrogen, an aryl radical, an alkyl radical, $NO_2$, $NH_2$, $CF_3$, $SO_2$, $CN$, $OCH_3$, Cl, F,

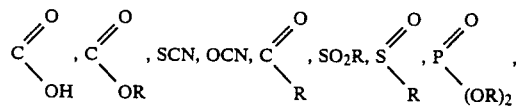

and SR wherein R is an aryl or alkyl radical. $R_1$ through $R_9$ may be the same or different. Preferred alkyl radicals are those having 1 to 8 carbon atoms. Preferred aryl radicals are those containing a phenyl radical.

The mesh stainless steel to be integrated with the conductive polymer is a network of stainless steel wires having a diameter of about 35 to about 120 μm, preferably about 40 to about 100 μm. If wires are thinner than about 35 μm, the conductive polymer deposit on the mesh shows a significantly varying weight distribution and the bond of the deposit to the mesh is insufficient so that the deposit tends to chip away or peel off, and the film formability evaluated as an outside appearance becomes poor. On the other hand, if wires are thicker than about 120 μm, the conductive polymer deposit is less firmly bonded to the mesh and the entire polymer composite becomes less flexible, adversely affecting processing and handling.

The mesh stainless steel preferably has an opening or mesh size of about 0.05 to about 0.3 mm. With an opening of less than 0.05 mm, there is some likelihood that the resulting conductive polymer film is not firmly bonded to the mesh and tends to chip away or peel off from the mesh. An opening of more than 0.3 mm might be undesirable in film formability because it is too large for the conductive polymer to smoothly grow over an empty space between wires.

The percent open area of the mesh stainless steel is also an important factor. With an open area of less than 30%, there is some likelihood that the resulting conductive polymer film is not firmly bonded to the mesh and tends to chip away or peel off from the mesh. When the condutive polymer is formed by electrolytic polymerization, it is preferred to set a working electrode horizontally during polymerization. If a mesh stainless steel which is immersed in a polymerization solution as the working electrode has an open area of less than 30%, more or less bubbles would stagnate under the mesh because bubbles can not move or escape through the mesh smoothly. The resulting conductive polymer deposit sometimes shows poor film formation. On the other hand, if the open area of the mesh is more than 50%, there is some likelihood that the empty space between wires is too large for the conductive polymer to smoothly grow over, also resulting in poor film formation. For the above reason, the open area preferably ranges from about 30 to about 50%.

Any desired composition of stainless steel may be used insofar as it is stable to electrolytic polymerization solution. Preferred are stainless steels containing up to about 10% by weight of nickel, most preferably up to about 5% by weight of nickel. Stainless steel of such a composition is highly corrosion resistant when a conductive polymer is deposited thereon. There is thus produced a conductive polymer-stainless steel substrate composite which can take full advantage of the conductive polymer deposit and is improved in cost, processability and strength.

In addition to nickel, the stainless steel composition preferably contains 10 to 45%, more preferably 15 to 35% by weight of chromium and up to 10%, more preferably up to 3% by weight of molybdenum. The stainless steel composition preferably contains up to 5%, more preferably up to 3% by weight in total of trace elements including C, Si, Mg, P and S.

Illustrative examples of the stainless steel include austenite stainless steels such as SUS 201, SUS 202, SUS 301, SUS 302, SUS 303, and SUS 304; austenite-ferrite stainless steels such as SUS 329; ferrite stainless steels such as SUS 405, SUS 410, SUS 429, SUS 430, SUS 434, SUS 436, SUS 444, and SUS 447; and martensite stainless steels such as SUS 403, SUS 410, SUS 416, SUS 420, SUS 429, SUS 431, and SUS 440. Preferred among them are ferrite stainless steels, typically SUS 430, SUS 444, and SUS 447.

The conductive polymer is integrally deposited onto the mesh stainless steel by electrolytic polymerization. The electrolytic polymerization process may be carried out by admitting an electrolytic polymerization solution in a tank, placing a mesh of the above-mentioned stainless steel as a working electrode (polymerization electrode) in the solution, placing a counter electrode in the solution with a predetermined spacing from the working electrode, and applying electricity across the electrodes to carry out electrolytic polymerization, thereby polymerizing and depositing a conductive polymer on the working electrode of mesh stainless steel. There is obtained a conductive polymer composite in which the conductive polymer is integrally bonded to the working electrode.

The material of which the counter electrode is made is not particularly limited insofar as it is conductive and insoluble in the polymerization solution during electrolysis. The counter electrode may be formed from stainless steel of the same or similar type as used in the working electrode. Other materials are also useful, for example, metal materials such as Pt, Au, Pd, Pb, Ni, Cu and Ti and graphite. These materials may also be used as electrodes in which the material is deposited on a suitable substrate such as a film or glass by evaporation, sputtering, or coating.

In preparing the conductive polymer by the above-mentioned electrolytic polymerization process, no particular limitation is imposed on the arrangement of the working and counter electrodes in the electrolytic tank. Preferably, the working and counter electrodes are placed horizontally in the polymerization solution in the tank, with the working electrode extending below the counter electrode. Then gases given off at the counter electrode during electrolytic polymerization will rise upward from the counter electrode without any substantial influence on a conductive polymer film being polymerized and deposited on the working electrode. There is thus obtained a conductive polymer film of high quality which has an even thickness and is free of pinholes and cracks. In addition, if the counter electrode located on an upper side is of a mesh or other form capable of gas permeation, then gases evolving at the under side of the counter electrode penetrate through the electrode and rise upward smoothly, obviating the likelihood that gases evolving on the under side of the counter electrode locally concentrate and stagnate under the counter electrode to disturb the current density on the working electrode. The use of a gas permeable counter electrode ensures that a conductive polymer film of homogeneity is deposited on the working electrode. It is also preferred to vibrate the counter electrode because vibration helps gases escape from the counter electrode.

The composition of the electrolytic polymerization solution and electrolytic conditions used in the practice of the present invention may be commonly used composition and conditions. They are not particularly limited and may be suitably chosen depending on the type, thickness and physical properties of a conductive polymer film to be deposited. When the monomer to be polymerized is aniline or a mixture of aniline and its derivative, the polymerizing solution may be either of aqueous system or of organic system as by dissolving the monomer in an organic solvent such as acetonitrile and benzonitrile along with a salt like $LiBF_4$. Preferred are acidic aqueous solutions containing the monomer along with an acid such as $HBF_4$, $HClO_4$ and $HCl$. Most preferred is an aqueous solution of $HBF_4$. In this case, the solution may preferably contain aniline in a concentration of 0.05 to 2 mol/liter, more preferably 0.5 to 1.6 mol/liter, and most preferably 0.8 to 1.3 mol/liter and $HBF_4$, if the acid is borofluoric acid, in a concentration of 0.1 to 4 mol/liter, more preferably 1 to 3.2 mol/liter, and most preferably 1.6 to 2.6 mol/liter.

The solution is preferably maintained at a temperature of from $-10°$ C. to $30°$ C., more preferably from $-5°$ C. to $10°$ C. during electrolytic polymerization. The polymerization method may be a controlled potential, cyclic, or pulse electrolysis method although a constant current electrolysis method capable of controlling polymerization quantity in terms of time is preferred. In electrolysis at constant current, it is preferred to supply current at a current density of 0.1 to 5 $mA/cm^2$ in an initial stage and 10 to 50 $mA/cm^2$ in a subsequent stage to a total quantity of 5 to 200 $C/cm^2$, more preferably 10 to 160 $C/cm^2$ (mA: milliampere, C: coulomb).

The conductive polymer composite obtained at the end of polymerization is washed with deionized water to remove the adhering extra polymerization solution and monomer. If desired, the composite may be washed with acetone or acetonitrile. The washing method is not particularly limited although suction washing by which washing solvent is passed through the composite, washing under pressure, and ultrasonic washing are preferably used. It is also contemplated to subject the conductive polymer composite to an electro-chemical or chemical reducing treatment, an alkaline treatment or an alcoholic treatment with ethanol, methanol or the like, if desired.

The negative electrode used in the cell of the present invention may be of any desired materials including conductive polymer composites similar to those used in the positive electrode and graphite as well as metals capable of providing a mono- or divalent cation such as lithium, sodium, potassium, magnesium, calcium, barium, zinc and alloys containing one or more of these metals. Among others, lithium and lithium alloys are preferred. The lithium alloys include alloys of lithium with one or more members selected from aluminum, indium, lead, bismuth, and cadmium, with lithium-aluminum alloys being most preferred.

When a lithium alloy is used as the negative electrode of the cell of the present invention, a method for making the lithium alloy is not particularly limited. Preferably, a lithium alloy electrode is prepared by (1) bonding together under pressure (A) a plate of pure lithium or a high lithium content lithium alloy, the content of lithium ranging from 100 to 80 mol%, and (B) a plate of a lithium-free alloying metal or a low lithium content lithium alloy, the content of lithium ranging from 0 to 10 mol %, to form a laminate in which at least one plate is a lithium alloy plate, and (2) immersing the laminate in an electrolyte solution comprising an organic solvent containing a lithium salt, thereby alloying lithium of component (A) to the alloying metal or lithium alloy of component (B) to form a lithium alloy electrode. The term "alloying metal" means a metal capable of alloying with lithium. With this method, a sound lithium alloy electrode free of residual lithium is readily and briefly prepared. Using the thus obtained lithium alloy electrode as the negative electrode, there is obtained a cell having extended cycle life and minimized self-discharge.

Commonly used prior art methods for preparing lithium alloy electrodes include (1) a metallurgical method of melting suitable proportions of lithium and a metal capable of alloying with lithium such as aluminum in an inert atmosphere to achieve alloying, and (2) an electrochemical method of dissolving a lithium salt in an organic solvent and electrodepositing lithium on an alloying metal from the solution to achieve alloying.

In preparing a lithium alloy electrode by metallurgical method (1), the charges must be heated to a high temperature, requiring a bulky complicated apparatus and a careful handling. As to electrochemical method (2), there are known (2-a) a method of forming a lithium alloy by combining lithium and an alloying metal to form a kind of electrolytic cell, and effecting external control to electrodeposit lithium on the alloying metal and (2-b) a method of forming a lithium alloy by bonding lithium to an alloying metal under pressure to form a laminate, and simply immersing the laminate in an organic solvent containing a lithium salt. The latter method (2-b) is relatively simple and free of the above-mentioned problems of the metallurgical method. However, method (2-b) using a laminate of lithium and an alloying metal takes a long time until alloying is completed at the interface between lithium and the alloying metal. Thus immersion must be continued for a long time. There is the drawback that lithium often remains intact even after immersion is continued for a long time. If a lithium alloy which has not been completely alloyed is used as a negative electrode to construct a secondary cell, the residual lithium might degrade the cell electrolyte or generate dendrites during charge/discharge process. There is another possibility that residual lithium might migrate into the cell electrolyte, causing self-discharge.

The above-mentioned many problems which the prior art alloying methods suffer from are overcome by the above-proposed method of forming a lithium alloy electrode by immersing a pressure bonded laminate of a lithium alloy plate with a high lithium content and another lithium alloy plate with a low lithium content in an electrolytic solution of a lithium salt in an organic solvent. This method will be described in further detail.

According to this method, a lithium alloy electrode is prepared by bonding (A) a lithium or lithium alloy plate having a lithium content of from 100 to 80 mol % and (B) a lithium-free alloying metal or lithium/alloying metal alloy plate having a lithium content of from 0 to 10 mol % together under pressure to form a laminate in which at least one plate is a lithium alloy plate. The laminate is immersed in an electrolyte solution comprising an organic solvent containing a lithium salt, thereby alloying lithium of component (A) to the alloying metal or lithium alloy of component (B) to form a lithium alloy electrode. As compared with a bonded laminate of a lithium plate and an alloying metal plate, the bonded laminate used in this method is significantly improved in the bond between the plates, preventing plate separation. In addition, since an electron transfer path necessary for alloying reaction is always maintained, complete alloying is achieved within a relatively short time. As a result, there is obtained a lithium alloy best suited as a cell electrode.

The bonded laminate may have various combinations of components (A) and (B), including (1) a bonded laminate of (A) a lithium alloy plate having a high lithium content of at least 80 mol %, preferably 90 to 99 mol % (to be referred to as lithium-rich alloy plate) and (B) an alloying metal plate substantially free of lithium, (2) a bonded laminate of (A) a pure lithium plate and (B) a lithium alloy plate having a low lithium content of up to 10 mol %, preferably 0.5 to 5 mol % (to be referred to as lithium-poor alloy plate), and (3) a bonded laminate of (A) a lithium-rich alloy plateand (B) a lithium-poor alloy plate.

The non-lithium metal which is the alloying metal or forms the lithium-rich alloy or lithium-poor alloy is not particularly limited as long as it can alloy with lithium. Preferred are those metals which are previously described as being preferred as the alloying metal when a lithium alloy is used as the negative electrode of the cell according to the present invention. Namely, aluminum, indium, lead, bismuth, and cadmium are included, with aluminum being especially preferred.

In preparing the bonded laminate, alloying can be achieved more completely by controlling the bond area between the two plates. Control of the bond area is described in further detail. When a lithium-rich alloy plate is pressure bonded to an alloying metal plate, the surface area (S1) of the lithium-rich alloy plate to be bonded is preferably smaller than the surface area (S2) of the alloying metal plate to be bonded. When a lithium plate is pressure bonded to a lithium-poor alloy plate, the surface area (S3) of the lithium plate to be bonded is preferably smaller than the surface area (S4) of the lithium-poor alloy plate to be bonded. More particularly, it is preferred that $0.8 \leq S1/S2 \leq 0.99$ in the former case and $0.8 \leq S3/S4 \leq 0.99$ in the latter case. When a lithium-rich alloy plate is pressure bonded to a lithium-poor alloy plate, the surface area (S5) of the lithium-rich alloy plate to be bonded is preferably smaller than the surface area (S6) of the lithium-poor alloy plate to be bonded. The ratio S5/S6 may be suitably chosen depending on the lithium content of the lithium alloy plates and the type of alloying metal. For example, when a lithium-aluminum alloy plate having a high lithium content of about 95 mol % is pressure bonded to a lithium-aluminum alloy plate having a low lithium content of about 2 mol %, it is preferred that $0.8 \leq S5/S6 \leq 0.99$.

Pressurizing conditions and method used in pressure bonding may be suitably chosen depending on the type of plates to be bonded and other factors. Bonding is preferably carried out under a pressure of about 10 to about 1000 kg/cm$^2$, more preferably about 50 to about 1000 kg/cm$^2$, most preferably about 100 to about 1000 kg/cm$^2$. Pressure may be applied by means of a press or screw type holder.

Alloying is then effected by immersing the bonded laminate in an electrolytic solution which contains a lithium salt in an organic solvent.

Non-limiting examples of the lithium salt used herein include LiPF$_6$, LiSbF$_6$, LiAsF$_6$, LiClO$_4$, LiI, LiBr, LiCl, LiBF$_4$, LiAlCl$_4$, LiHF$_2$, LiSCN, and a mixture of two or more of them. Preferred among them are LiClO$_4$ and LiBF$_4$. The lithium salt is desirably contained in a concentration of about 0.01 to about 10 mol/liter.

The solvent is preferably a relatively highly polar solvent. Examples of the solvents include propylene carbonate, ethylene carbonate, benzonitrile, acetonitrile, tetrahydrofuran, 2-methyltetrahydrofuran, γ-butyrolactone, triethylphosphate, triethylphosphite, dimethyl sulfate, dimethylformamide, dimethylacetoamide, dimethylsulfoxide, dioxane, dimethoxyethane, diethoxyethane, polyethylene glycol, sulfolane, dichloroethane, chlorobenzene, nitrobenzene, and mixtures of two or more of them. Preferred are propylene carbonate and a mixture of propylene carbonate with at least one member selected from dimethoxyethane, tetrahydrofurane, and γ-butyrolactone.

The electrolytic solution mentioned above may also be used as an electrolytic solution of the cell according to the present invention. It is therefore possible to form an electrode in situ by placing the above-mentioned bonded laminate in a cell casing without further treatment, admitting the above-mentioned organic solvent containing a lithium salt in the casing as the electrolytic solution to constitute a cell, and allowing the bonded laminate to convert into an alloy in the cell. This procedure simplifies the manufacturing process with a great economical benefit.

The electrolyte used in the cell according to the present invention may be selected from commonly used ones. Examples of the electrolyte include compounds consisting of anion and cation components, for example, VA Group element halide anions such as PF$_6^-$, SbF$_6^-$, AsF$_6^-$, and SbCl$_6^-$, IIIA Group element halide anions such as BF$_4^-$ and AlCl$_4^-$, halide anions such as I$^-$ ($I_3^-$), $Br^-$, and $Cl^-$, perchlorate anions such as $ClO_4^-$, and anions such as $HF_2^-$, $CF_3SO_3^-$, $SCN^-$, $SO_4^{2-}$, and $HSO_4^-$; and alkali metal ions such as $Li^+$, $Na^+$, and $K^+$, alkaline earth metal ions such as $Mg^{2+}$, $Ca^{2+}$, and $Ba^{2+}$, $Al^{3+}$, and quaternary ammonium ions such as $R_4N^+$ wherein R is hydrogen or a hydrocarbon residue. Illustrative, non-limiting examples of the electrolyte used in the cell include $NaPF_6$, $NaSbF_6$, $NaAsF_6$, $NaClO_4$, $NaI$, $KPF_6$, $KSbF_6$, $KAsF_6$, $KClO_4$, $KSCN$, $LiSO_3CF_3$, $(n-C_4H_7)_4NAsF_6$, $(n-C_4H_7)_4NClO_4$, $(n-C_4H_7)_4NBF_4$, $(C_2H_5)_4NClO_4$, and $(n-C_4H_7)_4NI$ as well as those electrolytes used in the above-mentioned alloying method.

These electrolytes are generally used as solutions. To this end, the solvent may preferably be selected from relatively highly polar non-aqueous solvents. Examples of the solvent are the same as those previously illustrated in conjunction with the alloying procedure.

The electrolytes used in the cell of the present invention may also be solid electrolytes. They include organic solid electrolytes which are obtained by impregnating such polymers as polyethylene oxide, polypropylene oxide, isocyanate-crosslinked polyethylene oxide, and phosphazine polymer having an ethylene oxide oligomer side chain with the above-mentioned electrolyte compounds; and inorganic solid electrolytes, for example, inorganic ion conductors such as $Li_3N$ and $LiBCl_4$ and lithium glass such as $Li_4SiO_4$-$Li_3BO_3$.

The cell of the present invention is generally constructed by interposing the electrolyte between the positive and negative electrodes. A separator may be interposed between the positive and negative electrodes in order to prevent the electrodes from contacting each other to cause current shortcircuit. The separator is preferably a porous material which can be impregnated with and allow passage of the electrolyte, for example, woven and non-woven fabrics, porous members and nets of synthetic resins such as polytetrafluoroethylene, polypropylene and polyethylene.

The cell according to the present invention includes the positive electrode, negative electrode, electrolyte, and optional separator as cell elements. The cell may be constructed in any shape including coin, cylindrical, and box shapes by containing the cell elements in a suitable container.

The cell container which receives the cell elements therein is generally composed of a casing and a lid. The cell elements are contained in the casing before the lid is secured or sealed to the casing to sealingly enclose the elements in the container. The securing or sealing step may be carried out by fastening, pressing, and welding. Welding, especially laser welding is most preferred because sealing by laser welding ensures a cell having improved shelf life and cycle performance.

When the lid is sealed to the casing by pressing or crimping to construct a secondary cell according to the present invention, a problem will sometimes occur. Since the conductive polymer used as a positive electrode active material expands upon charging and contracts upon discharging, the crimp tends to be loosened due to expansion and contraction of the conductive polymer positive electrode during service of the cell. There is the risk that the seal is broken to allow outside air to enter the cell container. Entry of air will cause a serious problem if lithium or lithium alloy is used as the negative electrode because lithium or lithium alloy is inactivated or generates hydrogen gas upon contact with impurities in air. The lithium or lithium alloy negative electrode reacts with air entering through a gap in the crimp, detracting from the performance of the cell. Particularly when a cell having an increased discharge capacity is desired, expansion and contraction of the positive electrode and reaction of the negative electrode with outside air have more influences, rendering it difficult to produce a secondary cell having improved shelf life and cycle performance.

Conversely, when a seal is formed by laser welding, the lid covers the opening of the casing in a fluid-tight manner and is tightly secured to the casing. The seal is kept fluid tight for an extended period of time. The welded seal is free of the risk that a crevice or gap is formed in the seal by expansion and contraction of the positive electrode or conductive polymer upon charging and discharging. The welded seal reliably blocks entry of air into the cell container, preventing the lithium or lithium alloy, when it is used as the negative electrode, from being deteriorated by external impurities. In any case, the welded seal is effective in preventing deterioration of the electrodes and leakage of liquid from within the cell. The cell thus shows improved shelf life and cycle performance.

When a seal is formed by laser welding, any desired metal materials may be used to form the casing and lid as long as they can be laser welded. For example, steel having a nickel coating is used with an economical benefit. Stainless steels such as SUS 304 and SUS 316L are also preferred because of strength.

The cell container is not particularly limited in the practice of the present invention. In general, an insulator formed of a dielectric synthetic resin is interposed between a positive electrode portion connected to the positive electrode and a negative electrode portion connected to the negative electrode, insulating the positive and negative electrode portions. The insulator used herein may be those insulators used in conventional cell containers such as polypropylene. Preferred insulators are heat resistant resins having a melting point of at least 170° C., for example, polyacetal, polyether ether ketone, nylon, polytetrafluoroethylene, and polyphenylene sulfide. The use of an insulator of such heat resistant resin has an advantage when the container is sealed by laser welding. Even when a laser beam applied to a sealing zone has a high energy such that the container is heated as a whole, it never occurs that the insulator softens to form a gap or deteriorates insulation. The insulator of heat resistant resin maintains a fluid-tight seal intact. Therefore, sealing operation can be completed within a short time by applying a laser beam having a high energy, reducing the manufacture time per cell. The use of an insulator of heat resistant resin is advantageous particularly when a seal is formed in a cell container of the shape wherein an insulator is located adjacent an area to be laser welded for cell application or other considerations. Laser beam application generates a large amount of heat which will soon transfer to the adjacent insulator. An insulator of low melting resin will be softened by this heat, undesirably forming a gap. To avoid such inconvenience, a laser beam of an extremely low energy must be used, which takes a long time to complete sealing. The use of an insulator of heat resistant resin allows the laser beam to have a high energy, which is very advantageous in reducing the cell manufacture time.

Laser welding may be carried out under ordinary conditions. The laser used herein is not particularly limited. YAG laser is most preferred because it has a high power density, is suitable for fine processing, and can be applied at any desired angle with the aid of an optical fiber conduit. Preferred laser welding conditions are: input voltage 300 to 700 volts, pulse width 0.1 to 9.9 msec., and repeating rate 1 to 200 pulses/sec.

FIG. 1 illustrates one preferred embodiment of manufacturing a cell according to the present invention by forming a seal in a container by laser welding. First, a cylindrical container casing 1 having a closed bottom and an upper opening is prepared. A positive electrode, a negative electrode, and a separator (not shown) are placed in the casing. The upper opening of the casing 1 is closed with a lid 2 and a seal 3 is formed between the casing and the lid by laser welding. The container at the end of the first sealing operation is shown in FIG. 1A. The lid 2 is formed at a center with a through hole. A tubular metallic positive terminal 5 having an axial bore 5a is secured to the hole in the lid 2 via an insulating collar 4. Then an electrolytic solution (liquid electrolyte E) is admitted into the container through the bore 5a in the terminal 5 as shown in FIG. 1B. After the container is allowed to stand for about one hour to about one week, a sealing rod 6 is inserted into the bore 5a in the terminal 5 as shown in FIG. 1C. The material of rod 6 is the same as terminal 5, for example, SUS 304, SUS 316L, and nickel coated steel. A seal 7 is formed between the rod and the terminal by laser welding. This second sealing is to seal the bore 5a in a fluid-tight manner.

The cell according to the present invention uses a conductive polymer as the positive electrode active material and preferably lithium or lithium alloy as the negative electrode as described above. Since the conductive polymer used as the positive electrode is a hygroscopic material or a material which is likely to adsorb water, it contains some water when it is placed in the casing. If a seal is formed between the casing and the lid immediately after the cell elements are placed in the casing, then water remaining in the conductive polymer of the positive electrode reacts with lithium or lithium alloy of the negative electrode to generate hydrogen gas, causing the cell container to blister. To avoid the blister, the sealing operation is postponed until hydrogen ceases to generate and the electrode dries. Then, the large upper opening of the casing allows the electrolytic solution to evaporate if the electrolytic solution has been filled. Even when the open container is allowed to stand in an inert gas atmosphere such as argon, more or less impurities will inevitably enter the container. Additionally, it is dangerous to laser weld a relatively large opening after the casing is filled with the electrolytic solution.

However, the above-mentioned two stage sealing procedure avoids such inconveniences After the first sealing operation, there remains only an opening in the form of the bore 5a. This opening allows hydrogen gas to escape from the container while it is small enough to prevent entry of impurities.

More particularly, the bore 5a preferably has a diameter of about 0.1 to about 10 mm. The bore is sealed after the container having the electrolytic solution introduced is allowed to stand until the water contents in the positive electrode or the container reacts with lithium in the negative electrode. Usually, the container is allowed to stand for about one hour to about one week.

The two stage sealing procedure illustrated in conjunction with FIG. 1 is more advantageously used as the size of the container becomes larger. The resulting cell has improved shelf life and cycle performance because the container is firmly closed by laser sealing even when the positive electrode expands and contracts upon charging and discharging. Entry of air into the cell is prevented. Even when lithium or lithium alloy is used as the negative electrode, deterioration thereof by external impurities is prevented. Neither deterioration of the electrodes nor leakage of liquid from within the container occurs.

In the two stage sealing procedure as illustrated in FIG. 1, in lieu of the bore in the terminal, the lid itself may be formed with a through hole which is eventually sealed. Sealing of such a hole may be carried out by laser welding or any other sealing methods. In this sense, the two stage sealing procedure is not limited to the above-illustrated embodiment.

For the cell of the present invention, it is preferred to increase the fluid tightness of the cell container as mentioned above. In the case of a cell for a certain application, there is the possibility that the internal pressure is abnormally increased due to gas generation by chemical reaction within the cell. In consideration of such a surge of cell internal pressure, it is desirable to discharge the gas from the cell to the outside. Therefore, the cell of the present invention is preferably provided with a vent mechanism for venting gas from the cell to the outside upon an extra rise of cell internal pressure.

The preferred vent mechanism is one which provide an effective seal during normal service, but when the cell internal pressure is abnormally increased due to gas generation within the cell, performs well as a vent to discharge the gas from the cell to the outside. Additional provision is preferably made to increase reliability such that the electrodes are not accidentally exposed to the outside both during and after operation of the vent mechanism. None of prior art vent mechanisms fully meet the above-mentioned requirements.

For example, prior art known vent mechanisms include a resinous seal adapted to be broken by a cutting edge of metal material; a seal of glass-metal or ceramic-metal adapted to crack due to a rise of internal pressure; a thin film of soft metal such as aluminum; a member having a circular, polygonal or linear thin-wall groove at which the member is breakable; a rubber plug having a vent valve built therein; and a gas-permeable membrane. These vent mechanisms are not suitable for the cell of the present invention particularly when lithium or lithium alloy is used as the negative electrode. For example, when a rubber plug having a vent valve built therein, which is often used in closed lead-acid storage batteries, is used in the cell of the present invention, the plug will swell upon contact with non-aqueous solvent to lose its rubbery nature. The rubber plug whose sealing properties are deteriorated tends to allow impurities to enter the cell, detracting from the cell performance. A gas-permeable membrane has the following problem. Gases generated in the cell of the present invention contain carbon dioxide and low-boiling organic compounds such as acetylene, ethane and propylene, and these gases can pass through pores in the membrane to the outside. Conversely, the membrane allows outside gases having a smaller molecule diameter such as oxygen, nitrogen and water vapor to enter the cell interior, detracting from the cell performance. A member having a friable thin-wall groove is broken over a relatively large area through which the electrodes can be exposed outside. If lithium or lithium alloy is used as the negative electrode, there is the risk of ignition and combustion upon contact of outside air with the electrode. A thin film of soft metal such as aluminum is not applicable to a cell using lithium or lithium alloy as the negative electrode because the soft metal forms a brittle alloy with lithium.

For these reasons, we have developed a vent mechanism which can meet the above-mentioned requirements and is applicable to a cell using lithium or lithium alloy as the negative electrode. One preferred vent mechanism used herein includes a vent port perforated in the cell container, a tubular hollow vent member having an axial bore secured at a base end to the container to extend through the vent port, and a crown cap fitted around the hollow member to close the bore, the crown cap having a cylindrical wall which is radially inwardly dented along its circumference at a suitable level to form an annular crest whereby the annular crest is in pressure contact with the outer surface of the hollow member with or without a protector interposed therebetween. Another preferred vent mechanism may be constructed as a thin wall portion with an area of up to 20 mm$^2$ formed in part of the cell container. The thin wall portion is breakable when the internal pressure of the cell rises beyond a predetermined level.

In the former vent mechanism, the headed cylindrical crown cap is fastened to the top of the cylindrical hollow vent member by a crimping or staking technique to constitute a vent valve. Upon an abnormal rise of the internal pressure in the cell due to gas generation, the gas forces the crown outwardly through the vent port and the bore to deform or bulge the crown. When the gas pressure further rises, the gas reaches the annular crest on the cylindrical wall of the crown through a gap between the hollow member and the crown to force the wall radially outwardly to cancel the pressure contact or engagement of the crest with the hollow member, forming a gap between the crest and the hollow member. The gas escapes to the outside through this gap until the internal pressure lowers in the cell. Even if the crown is blown off, there is little danger that the electrodes are exposed outside the container. Since the cell interior is communicated to the outside only through the bore having a relatively small diameter, there is no risk that even when lithium or lithium alloy is used as the negative electrode, the negative electrode abruptly contacts outside air over a large area to ignite and combust. Outside air enters the cell through the bore only little by little so that the negative electrode containing lithium is gradually deteriorated. This vent mechanism provides a tight seal under normal operation and is reliable for an extended period of time partially because it does not rely on a gas-permeable membrane or rubber plug.

In the latter vent mechanism, a fragile or thin wall portion with an area of up to 20 mm$^2$ is formed in part of the cell container. A tight seal continues during normal operation. The thin wall portion is broken to form a vent when the internal pressure of the cell rises beyond a predetermined level. The gas escapes outside the cell through the vent. With this structure, the vent formed as a result of breakage of the thin wall portion is limited to a relatively small area, avoiding the risk that the electrodes are accidentally exposed outside after breakage.

These vent mechanisms are described in further detail.

The vent mechanism of the first preferred embodiment is a vent valve comprising a vent member and a crown lid.

Figure 2:
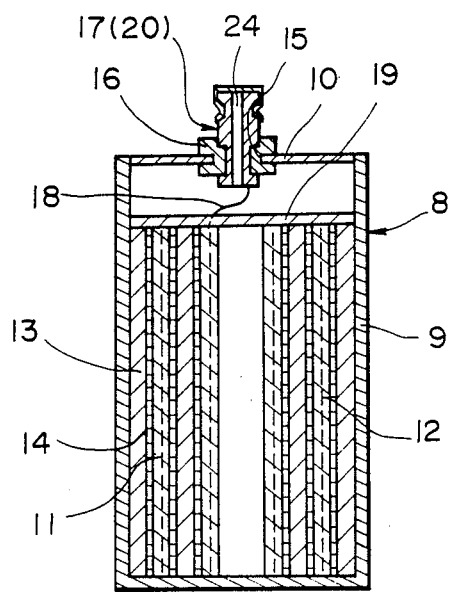
FIG. 2 is a cross section of a cell according to one embodiment of the present invention.
Figure 3:
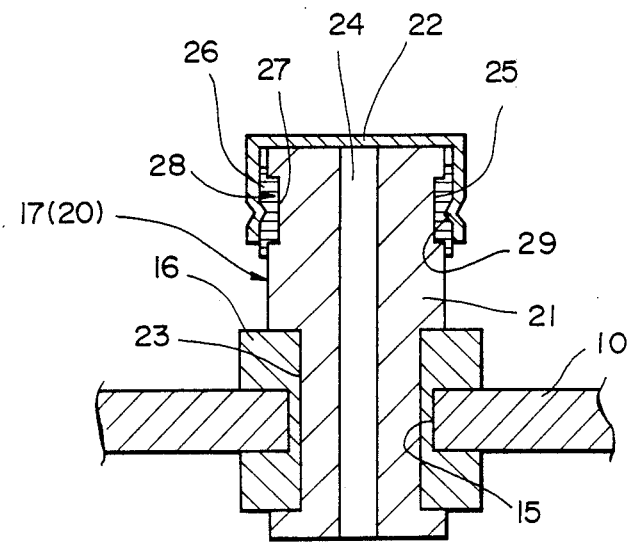
FIG. 3 is an enlarged cross section of a positive electrode terminal portion of the cell of FIG. 2.

Referring to FIGS. 2 and 3, there is illustrated a cell according to the present invention which is provided with a vent mechanism. A cell container 8 includes a cylindrical casing 9 having an upper opening and a closed bottom and a lid 10 secured to the upper opening of the casing to provide a fluid tight seal. The casing 9 has received therein a roll of electrode structure which is formed by placing a positive electrode 12 in the form of a conductive polymer composite having a collector 11 embedded therein on a negative electrode 13 via a separator 14 and rounding the sandwich structure into a roll. The outer turn of negative electrode 13 is in contact with the casing 9 which constitutes a negative terminal. The collector 11 of the positive electrode 12 is connected via a lead 18 to a metallic positive terminal 17 which is held in an insulating collar 16 which is in turn, secured to an opening 15 at the center of the lid 10. An insulating disc 19 is placed on the roll electrode structure. The insulating collar 16 which forms a hermetic seal may be formed of glass or synthetic resins such as polypropylene, polyacetal, and polyether ether ketone.

The positive terminal 17 constitutes a vent valve 20 at the same time. The vent valve 20 (or positive terminal 17) includes a cylindrical hollow member 21 and a cylindrical crown cap 22. The hollow member 21 at a lower portion is fitted in and secured to the opening 15 in the lid 10 via the insulating collar 16 which is mounted in an annular recess 23 circumferentially formed in a lower outer surface of the hollow member 21. The hollow member 21 has an axial bore 24 which constitutes a gas passage and communicates with the interior of the casing 9. The hollow member 21 is also circumferentially formed at an upper outer surface with another annular recess 25. A protector 28 of insulating material is snugly fitted in the upper recess 25. More particularly, the protector 28 has a laterally convex cross section, that is, includes a ring band 26 and an annular mesa 27 circumferentially extending on a central inside surface portion of the ring band 26 and adapted to fit in the recess 25.

The crown cap 22 is fitted over the hollow member 21 so as to cover the upper opening of the bore 24 in the member. The crown 22 includes a top flat circular portion and a cylindrical portion extending downward from the top portion. At a position facing the center of the protector 28, the cylindrical portion of the crown 22 is provided with an annular inward crest 29 by radially inwardly denting the portion along its circumference. Then, when the crown 22 is fitted on the hollow member 21, the crest 29 forces the protector 28 along its central circumference to form an annular dent. The crest 29 is thus in close fluid-tight contact with the protector 28. The crown 22 is tightly secured to the hollow member 21 in this way.

The protector 28 may preferably formed of an insulating material, especially those resins having resistance to organic electrolytic solution and a high elongation at rupture, such as polypropylene, polytetrafluoroethylene, and polyethylene.

The cell of the above-illustrated construction may be prepared by first placing the electrode and other elements in the casing 9. The lid 10 having the hollow vent member 21 mounted thereon is placed to substantially close the casing 9. A first sealing operation of forming a fluid-tight seal around the upper opening of the casing is carried out by laser welding the lid 10 to the casing 9. Then an electrolytic solution (or liquid electrolyte) is poured into the casing 9 through the bore 24 in the hollow member 21. The entire assembly is allowed to stand for a predetermined time. The crown cap 22 is then fitted over the hollow member 21 as exaggeratedly shown in FIG. 4. The crown 22 is crimped against the hollow member 21 by means of dies 30. The crown 22 is sealingly fastened to the hollow member 21 via the protector 28, completing a second sealing operation of interrupting communication of the bore 24 to the outside.

The cell of the above construction maintains a tight seal during normal service because neither a gas-permeable membrane nor a rubber plug is used. The failsafe mechanism performs when the internal pressure is abnormally raised due to gas generation within the cell. Gases accumulate in the cell interior space including the bore 24 of the hollow member 21 so that the top wall of the crown 22 is deformed or bulged upward by the gas pressure. If the gas pressure further increases, the gas reaches the annular inward crest 29 past a gap formed between the hollow member 21 and the crown 22 and urges the cylindrical wall of the crown 22 radially outward to release the pressure contact between the crest 29 and the protector 28 to locally disengage the cylindrical wall of the crown 22 from the protector 28, forming a gap therebeween. The gas is discharged to the outside through the gap to lower the internal pressure in the cell container. This construction avoids the risk that the electrodes, particularly the negative electrode is accidentally exposed outside the container upon discharge of the internal gas. Even if the crown 22 is blown off, there is little danger because the cell interior is communicated to the outside only through the bore 24 having a relatively small diameter. Outside air can enter the cell through the bore 24 only little by little so that the negative electrode containing lithium is gradually deteriorated.

To the above end, the bore 24 preferably has a diameter of about 0.1 to about 10 mm.

Figure 4:
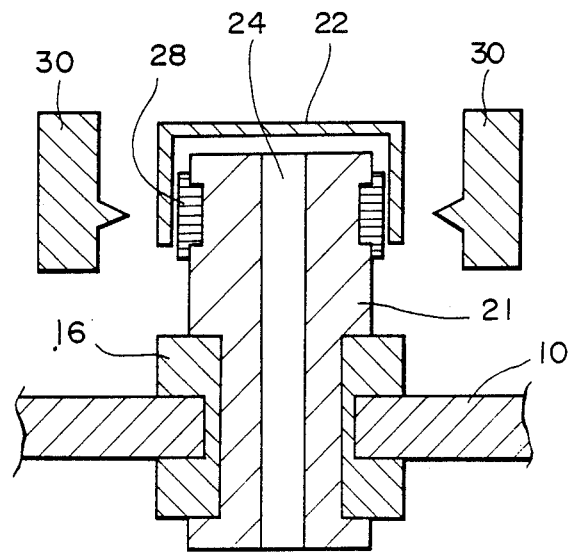
FIG. 4 is a cross-sectional view of a positive electrode terminal portion of the cell similar to FIG. 3, illustrating a crimping step during manufacture.

The vent mechanism is not limited to the embodiment shown in FIGS. 2 to 4.

The other vent mechanism based on a thin wall portion in the cell container is described below. The material and shape of the cell container to which the other vent mechanism is applied are not particularly limited. Any of common cell containers may be used. Preferred examples of the material are nickel-plated soft steel and stainless steel because they do not substantially alloy with lithium and are resistant to organic electrolytic solution. The shape may be a coin, cylindrical, box or any other shape. The cell is generally composed of a casing and a lid. Either or both of the casing and the lid may be provided with a thin wall portion.

The method of forming a thin wall portion is not particularly limited and any desired methods may be used. For example, a thin wall portion may be formed in the cell container by machining part of the container by means of a drill, by applying a heat energy like laser beams, or by pressing the container by means of a die. It is also possible to form a thin-wall portion by perforating part of the container and welding or bonding a piece of thin foil to the perforation. In the last-mentioned method, the foil material may be the same as or different from the material of the container as long as it does not substantially alloy with lithium and is resistant to organic electrolytic solution. Bonding of a foil may be achieved with an epoxy or similar adhesive.

The area and thickness of the thin wall portion may be adequately chosen depending on the material of the thin wall portion (particularly, the breakage strength of material) and the expected pressure. Generally, the thin wall portion has an area of about up to 20 $mm^2$, preferably from 0.1 to 10 $mm^2$ and a thickness of about $10^{-3}$ to about $10^{-1}$ mm.

As described above, the cell comprising a conductive polymer integrated to a stainless steel mesh collector as a positive electrode active material according to the present invention maintains its excellent performance over an extended period of time without a loss of performance due to peeling or chipping of the active material from the collector.

EXAMPLES

Examples of the present invention are given below together with comparative examples. The examples illustrate the invention, but the invention is not limited thereto. In the examples, mA is milliampere, V is volt, and C is coulomb.

EXAMPLE 1

Polyaniline was deposited on a working electrode or stainless steel mesh through electrolytic polymerization. In an acidic aqueous solution containing 1 mol/liter of aniline and 2 mol/liter of borofluoric acid were disposed a working electrode in the form of a stainless steel mesh (SUS 316) having an opening of 0.062 mm, a wire diameter of 50 μm, and an open area of 37% and a counter electrode in the form of a punched metal of SUS 316. The working and counter electrodes were extended horizontally and opposed to each other, with the counter electrode disposed above the working electrode. The polymerization area had a size of 30 cm by 8 cm. Polymerization was carried out at a temperature of 5° C. by supplying current at a current density of 2 $mA/cm^2$ from an electricity quantity of 0 to 200 C and subsequently at a current density of 20 $mA/cm^2$ to an electricity quantity of 15,000 C.

At the end of polymerization, the working electrode was washed with 5 liters of deionized water at 10° C. by a suction washing method and then dried to a constant weight in an oven at 30° C. There was obtained a conductive polymer (polyaniline) composite which had a thickness of 1.2 mm and showed good film formability without chipping or peeling of the polyaniline film.

The conductive polymer composite thus obtained was divided into square pieces of 2 cm by 2 cm. The weight distribution of polyaniline portions was determined by weighing the pieces individually and subtracting the weight corresponding to the stainless steel mesh from the weight of each piece. An average weight of 139 mg per piece was computed with a standard deviation of 1.8 mg.

Sixty (60) coin type cells were fabricated by using a disc having a diameter of 15 mm which was punched out of the conductive polymer composite as the positive electrode, a lithium-aluminum alloy as the negative electrode, and a solution of 2.5 mol/liter of $LiBF_4$ in a 1:1 solvent mixture of propylene carbonate and dimethoxyethane as the electrolytic solution.

The 60 coin type cells were subjected to a cyclic charge/discharge test at 23° C. One cycle consisted of discharging at a constant current of 0.5 mA up to 2.0 V, charging at a constant current of 0.5 mA up to 3.0 V and further charging at a constant voltage of 3.0 V for a total charging time of 8 hours. Each cell was measured for discharge capacity at the fifth cycle and internal resistance at the sixth cycle. The results are shown in Table 1.

EXAMPLE 2

A conductive polymer (polyaniline) composite was obtained by the same procedures of polymerization, washing, and drying as in Example 1 except that the working electrode used in electrolytic polymerization was a stainless steel mesh (SUS 316) having an opening of 0.154 mm, a wire diameter of 100 μm, and an open area of 37%, and the current density was set at 1.5 mA/cm$^2$ from an electricity quantity of 0 to 150 C and subsequently at 15 mA/cm$^2$ up to an electricity quantity of 12,000 C. The resulting conductive polymer (polyaniline) composite had a thickness of 1.1 mm and showed good film formability without chipping or peeling of the polyaniline film.

The weight distribution of polyaniline deposit was determined in the same manner as in Example 1 to find an average weight of 108 mg per piece with a standard deviation of 1.1 mg.

Sixty (60) coin type cells were fabricated as in Example 1 by using discs having a diameter of 15 mm which were punched out of the conductive polymer composite as the positive electrode. The cells were subjected to the same charge/discharge test as in Example 1 to measure the discharge capacity and internal resistance. The results are shown in Table 1.

COMPARATIVE EXAMPLE 1

A conductive polymer (polyaniline) composite was obtained by the same procedures of polymerization, washing, and drying as in Example 1 except that the working electrode used in electrolytic polymerization was a stainless steel mesh (SUS 316) having an opening of 0.034 mm, a wire diameter of 30 μm, and an open area of 28%. In the resulting conductive polymer (polyaniline) composite, chipping and peeling of the polyaniline film were observed particularly near its corners, but film formability was good except the chipped or delaminated areas.

Only an area with good film formability was chosen to determine the weight distribution of polyaniline deposit in the same manner as in Example 1. Those pieces cut from a central area had a smaller weight than those from a peripheral area. The average weight was 131 mg per piece with a standard deviation of 4.1 mg.

Forty one (41) coin type cells were fabricated as in Example 1 by using discs having a diameter of 15 mm which were punched out of the conductive polymer composite as the positive electrode The cells were subjected to the same charge/discharge test as in Example 1 to measure the discharge capacity and internal resistance. The results are shown in Table 1.

COMPARATIVE EXAMPLE 2

A conductive polymer (polyaniline) composite was obtained by the same procedures of polymerization, washing, and drying as in Example 1 except that the working electrode used in electrolytic polymerization was a stainless steel mesh (SUS 316) having an opening of 0.37 mm, a wire diameter of 140 μm, and an open area of 53%. The resulting conductive polymer (polyaniline) composite showed poor film formability because some local areas had such a small weight of polyaniline deposited that they were clearly perceivable to the naked eyes. This composite was less flexible and thus unsuitable to the application where curvature is required.

Sixty (60) coin type cells were fabricated as in Example 1 by using discs having a diameter of 15 mm which were punched out of the conductive polymer composite as the positive electrode. The cells were subjected to the same charge/discharge test as in Example 1 to measure the discharge capacity and internal resistance. The results are shown in Table 1.

TABLE 1

| Positive electrode composite | Number of samples | Discharge capacity (mAh) | | | | Internal Resistance (Ω) | | |
|---|---|---|---|---|---|---|---|---|
| | | Max | Min | Average | S.D. | Average | S.D. | >30Ω |
| E1 | 60 | 4.29 | 3.70 | 3.82 | 0.05 | 12.1 | 1.0 | 0 |
| E2 | 60 | 3.30 | 2.95 | 3.02 | 0.03 | 11.2 | 0.7 | 0 |
| CE1 | 41 | 4.60 | 3.21 | 3.57 | 0.38 | 17.8 | 5.8 | 4 |
| CE2 | 60 | 3.89 | 1.17 | 2.68 | 0.80 | 20.5 | — | 11 |

*S.D.: standard deviation
>30Ω: number of samples having an internal resistance of more than 30Ω.

EXAMPLE 3

Polyaniline was deposited on a working electrode or stainless steel mesh through electrolytic polymerization. In an acidic aqueous solution containing 1 mol/liter of aniline and 2 mol/liter of borofluoric acid (HBF$_4$) were disposed a working electrode in the form of a stainless steel mesh of the composition shown below having an opening of 0.062 mm, a wire diameter of 50 μm, and an open area of 37% and a counter electrode in the form of a platinum plate. Electrolytic oxidative polymerization was carried out for 2.5 hours at a temperature of 15° C. by supplying constant current to the working electrode at a current density of 6 mA/cm$^2$. A polyaniline film deposited on the surface of the working electrode, obtaining a composite material in which the polyaniline film was tightly integrated with the working electrode.

| Stainless steel composition (% by weight) | |
|---|---|
| C | ≦0.12% |
| Si | ≦0.75% |
| Mn | ≦1.00% |
| P | ≦0.040% |
| S | ≦0.030% |
| Ni | ≈0% |
| Cr | 17.00% |
| Mo | ≈0% |
| Fe | balance |

The composite material was washed with distilled water and then thoroughly dried.

A secondary cell was fabricated using the composite without further processing. That is, the polyaniline film formed a positive electrode and the working electrode formed a collector. The negative electrode used was a Li-Al alloy. The electrolytic solution used was a solution of 1 mol/liter of LiBF$_4$ in a 1:1 solvent mixture of propylene carbonate and dimethoxyethane.

The cell was subjected to a cyclic charge/discharge test at a fixed temperature of 60° C. One cycle consisted of charging the cell with a constant current at 0.6 mA/cm$^2$ up to 3.3 V and discharging the cell with a constant current at 0.6 mA/cm$^2$ up to 2.0 V. The charge/discharge cycle was repeated until the discharge capacity of the cell lowered to less than 50% of the initial capacity. The number of cycles at this point is a cycle life.

The test showed a cycle life of 87 cycles, proving that the cell having a positive electrode in the form of the composite material having the polyaniline film integrated with the stainless steel mesh or working electrode had improved cycle performance.

EXAMPLE 4

Electrolytic oxidative polymerization of polyaniline was carried out by the same procedure of Example 3 except that the working electrode used was a stainless steel mesh of the composition shown below having an opening of 0.062 mm, a wire diameter of 50 μm, and an open area of 37%. A polyaniline film deposited on the surface of the working electrode, obtaining a composite material in which the polyaniline film was tightly integrated with the working electrode.

| Stainless steel composition (% by weight) | |
|---|---|
| C | ≦0.08% |
| Si | ≦1.00% |
| Mn | ≦2.00% |
| P | ≦0.045% |
| S | ≦0.030% |
| Ni | 9.30% |
| Cr | 19.50% |
| Mo | ≈0% |
| Fe | balance |

A secondary cell was fabricated in the same manner as in Example 3 using the composite whereby the polyaniline film formed a positive electrode and the working electrode formed a positive collector. The cell was subjected to a cyclic charge/discharge test. The test showed a cycle life of 68 cycles, proving that the cell having a positive electrode in the form of the composite material having the polyaniline film integrated with the stainless steel mesh or working electrode had improved cycle performance.

EXAMPLE 5

Electrolytic oxidative polymerization of polyaniline was carried out by the same procedure of Example 3 except that the working electrode used was a stainless steel mesh of the composition shown below having an opening of 0.154 mm, a wire diameter of 100 μm, and an open area of 37%. A polyaniline film deposited on the surface of the working electrode, obtaining a composite material in which the polyaniline film was tightly integrated with the working electrode.

| Stainless steel composition (% by weight) | |
|---|---|
| C | ≦0.015% |
| Si | ≦0.50% |
| Mn | ≦0.50% |
| P | ≦0.04% |
| S | ≦0.03% |
| Ni | ≈0% |
| Cr | 19.00% |
| Mo | 1.95% |
| Fe | balance |

A secondary cell was fabricated in the same manner as in Example 3 using the composite whereby the polyaniline film formed a positive electrode and the working electrode formed a positive collector. The cell was subjected to a cyclic charge/discharge test. The test showed a cycle life of 73 cycles, proving that the cell having a positive electrode in the form of the composite material having the polyaniline film integrated with the stainless steel mesh or working electrode had improved cycle performance.

EXAMPLE 6

Electrolytic oxidative polymerization of polyaniline was carried out by the same procedure of Example 3 except that the working electrode used was a stainless steel mesh of the composition shown below having an opening of 0.154 mm, a wire diameter of 100 μm, and an open area of 37%. A polyaniline film deposited on the surface of the working electrode, obtaining a composite material in which the polyaniline film was tightly integrated with the working electrode.

| Stainless steel composition (% by weight) | |
|---|---|
| C | 0.03% |
| Si | 0.15% |
| Mn | 0.04% |
| P | 0.015% |
| S | 0.015% |
| Ni | 0.18% |
| Cr | 30.0% |
| Mo | 2.0% |
| Fe | balance |

A secondary cell was fabricated in the same manner as in Example 3 using the composite whereby the polyaniline film formed a positive electrode and the working electrode formed a positive collector. The cell was subjected to a cyclic charge/discharge test. The test showed a cycle life of 103 cycles, proving that the cell having a positive electrode in the form of the composite material having the polyaniline film integrated with the stainless steel mesh or working electrode had improved cycle performance.

EXAMPLE 7

Polyaniline was deposited on a working electrode or stainless steel mesh through electrolytic polymerization. In an acidic aqueous solution containing 1 mol/liter of aniline and 2 mol/liter of borofluoric acid (HBF$_4$) were disposed a working electrode in the form of a stainless steel mesh having an opening of 0.062 mm, a wire diameter of 50 μm, and an open area of 37% and a counter electrode of stailess steel. Electrolytic oxidative polymerization was carried out for 2.5 hours at a temperature of 15° C. by supplying constant current to the working electrode at a current density of 6 mA/cm$^2$. A polyaniline film deposited on the surface of the working electrode, obtaining a composite material in which the polyaniline film was tightly integrated with the working electrode.

The composite material was washed with distilled water and then thoroughly dried. A coin-type secondary cell with a diameter of 2.0 cm and a thickness of 1.6 mm was fabricated using the composite whereby the polyaniline film formed a positive electrode and the working electrode formed a positive collector. The negative electrode used was a bonded laminate which was prepared by bonding an aluminum disc with a diameter of 1.5 cm and a thickness of 200 μm to a similar disc of a lithium-aluminum alloy having a lithium content of 92 mol % under pressure. The electrolytic solution used was a solution of $LiBF_4$ in a solvent mixture of propylene carbonate and dimethoxyethane. A separator of polypropylene was sandwiched between the positive and negative electrode. The cell was sealed using a gasket of polypropylene.

The cell was disassembled 6 days after fabrication. The negative electrode was taken out to find that a grey alloy was formed over the entire surface and no residual metallic lithium was observed.

The cell was separately determined for cycle life by repeatedly charging and discharging the cell at a constant current of 1.0 mA each for one hour. The maximum permissible number of charge/discharge cycles was 1903.

EXAMPLE 8

A coin-type secondary cell was fabricated by the same procedures as in Example 7 except that the negative electrode used was a bonded laminate which was prepared by bonding a disc of a lithium-aluminum alloy having a lithium content of 3 mol % with a diameter of 1.5 cm and a thickness of 200 μm to a similar lithium disc under pressure.

The cell was disassembled 6 days after fabrication. The negative electrode was taken out to find that a grey alloy was formed over the entire surface and no residual metallic lithium was observed.

The cell was separately determined for cycle life by repeatedly charging and discharging the cell at a constant current of 1.0 mA each for one hour. The maximum permissible number of charge/discharge cycles was 1890.

EXAMPLE 9

Polyaniline was deposited on a working electrode or stainless steel mesh through electrolytic polymerization. In an acidic aqueous solution containing 1 mol/liter of aniline and 2 mol/liter of borofluoric acid ($HBF_4$) were disposed a working electrode in the form of a stainless steel mesh having an opening of 0.062 mm, a wire diameter of 50 μm, and an open area of 37% and a counter electrode of stailess steel. Electrolytive oxidative polymerization was carried out for 2.5 hours at a temperature of 15° C. by supplying constant current to the working electrode at a current density of 6 $mA/cm^2$. A polyaniline film deposited on the surface of the working electrode, obtaining a composite material in which the polyaniline film was tightly integrated with the working electrode. The composite material was washed with distilled water and then thoroughly dried.

A secondary cell of a cylindrical shape as shown in FIG. 1 was fabricated using the composite of 200 mm by 34 mm by 1.1 mm thick without further processing whereby the polyaniline film formed a positive electrode and the working electrode formed a positive collector. The negative electrode used was a lithium-aluminum alloy electrode which was prepared by sandwiching an aluminum plate of 180 mm by 34 mm by 200 μm thick between a lithium plate of 180 mm by 30 mm by 200 μm thick and another lithium plate of 140 mm by 30 mm by 200 μm thick under pressure following by alloying. A bag of porous polypropylene membrane serving as a separator was packed with the positive electrode. The positive and negative electrodes were rounded into a roll so that the outermost turn of lithium-aluminum alloy electrode was exposed outside. The roll was placed in a bottomed cylindrical casing of SUS stainless steel having a diameter of 23 mm and a height of 43 mm.

An insulating collar was snugly fitted on a positive terminal in the form of a hollow tube having an axial bore with a diameter of 0.7 mm to form a positive electrode terminal assembly, which was engaged to an opening in a lid of SUS stainless steel. The lid was placed so as to close the top opening of the casing. The lid was sealed to the casing by YAG laser welding.

The cell container was evacuated to a vacuum of 1 mm Hg through the bore in the positive terminal assembly and then charged with 5.6 ml of an electrolytic solution of 3 mol/liter of $LiBF_4$ in a 1:1 (by volume) mixture of propylene carbonate and dimethoxyethane. The container was allowed to stand for 2 days or until no further generation of hydrogen gas was observed. A stainless steel wire with a diameter of 0.7 mm and a length of 10 mm was inserted into the bore and laser welded to the bore. The polymeric secondary cell was completed in this way. It is to be noted that all the above-mentioned operations were carried out under an inert atmosphere of argon gas.

Figure 5:
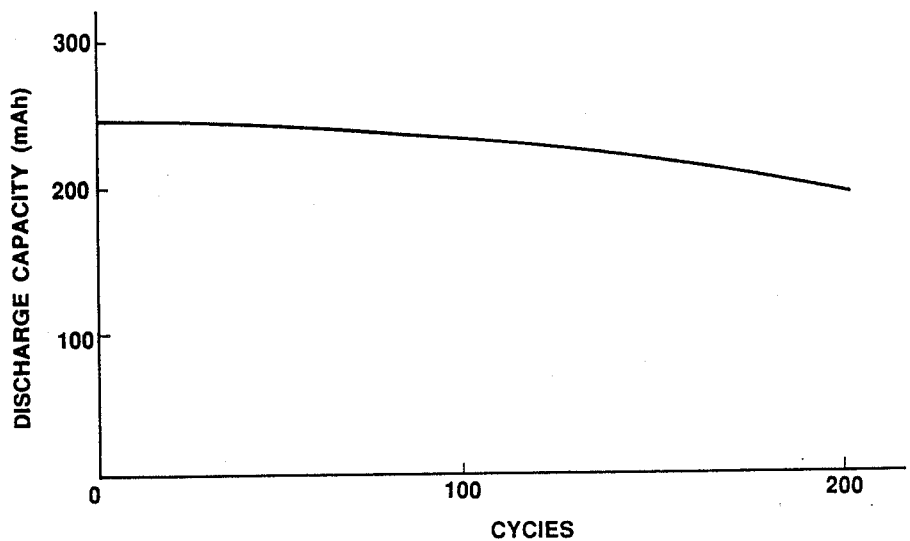
FIG. 5 is a diagram showing the discharge capacity of the cell of Example 9 as a function of charge/discharge cycles.

The secondary cell was dried in vacuum for a week in an oven at 60° C. to find no weight loss. The cell was then subjected to a cyclic charge/discharge test under conditions: charging current 50 mA, upper limit voltage 3.3 V, discharging current 50 mA, and lower limit voltage 2 V. In FIG. 5, the discharge capacity was plotted as a function of cycle number. The cell maintained a capacity of 90% of the initial value even after 200 cyles.

EXAMPLE 10

Reference is made to FIGS. 6 to 9. A casing 31 of stainless steel (SUS 304) as shown in FIG. 7 was prepared having dimensions of 20 mm by 6 mm by 65 mm long and a wall thickness of 0.5 mm with an opening 32 of 19 mm by 5 mm. A lid 33 of stainless steel (SUS 304) as shown in FIG. 8 was prepared having dimensions of 19 mm by 5 mm by 1 mm thick. The lid 33 had an opening 35 perforated at a center thereof. A positive terminal 37 of stainless steel (SUS 316L) having an axial bore 37a with a diameter of 0.7 mm was secured to the opening 35 in the lid 33 via an insulating collar 36 of polytetrafluoroethylene having a melting point of 325° C.

A negative electrode 40 as shown in FIG. 9 was prepared by placing a lithium strip 39 of 230 mm by 15 mm by 0.2 mm thick to one surface of an aluminum strip 38 of 240 mm by 18 mm by 0.3 mm thick, pressing them together under a pressure of 100 $kg/cm^2$, and folding the bonded laminate five times into a W shape such that the lithium strip was inside. A positive electrode 42 was prepared by depositing polyaniline on a stainless steel mesh having an opening of 0.062 mm, a wire diameter of 50 μm, and an open area of 37% through electrolytic polymerization to form a polyaniline-stainless steel composite to a thickness of 1 mm, and cutting out a strip of 120 mm by 16 mm from the composite. A lead 41 was spot welded to the stainless steel mesh at a center of the composite strip 40. A bag of porous polypropylene membrane which served as a separator was packed with the composite strip. The positive electrode 42 was folded into a U shape and interdigitated with the W-shaped negative electrode 40. The assembly was placed in the casing 31. The negative electrode 40 was in pressure and ohmic contact with the inside surface of the casing 31. Then the lead 41 of the positive electrode 42 was spot welded to the positive terminal 37 of the lid 33, which was placed so as to close the top opening 32 of the casing 31. An insulating spacer 43 of polypropylene was interposed between the electrode assembly and the lid 33 to prevent any contact of the lead 41 with the container 34. The lead 41 extended from the positive electrode 42 to the positive terminal 37 through a hole 44 in the insulating spacer 43 at a center thereof. The lid 33 was sealed at 32 to the top opening 32 of the casing 31 by pulse oscillating YAG laser welding 45. The laser welding conditions were: spot diameter 0.5 mm, laser output 1 Joule/pulse, frequency 20 pulses/sec., scanning speed 2 mm/sec., and overall output 20 watts, resulting in a welding time of 24 seconds per the entire periphery of the opening 32. In this way, a box-shaped battery 46 was fabricatd as shown in FIG. 6.

The container 34 was then evacuated to a vacuum of 1 mmHg through the bore 37a in the positive terminal 37 and then charged with 2.4 ml of an electrolytic solution of 3 H mol/liter of $LiBF_4$ in a 1:1 (by volume) mixture of propylene carbonate and dimethoxyethane. The container was allowed to stand for 2 days or until no further generation of hydrogen gas was observed. A stainless steel wire with a diameter of 0.7 mm and a length of 10 mm was inserted into the bore and laser welded at 47 to the bore. The secondary battery was completed in this way. It is to be noted that all the above-mentioned operations were carried out under an inert atmosphere of argon gas.

The secondary battery was dried in vacuum for a week in an oven at 60° C. to find no weight loss. No heat distortion was observed in the insulating collar 36.

EXAMPLE 11

A box-shaped secondary battery was fabricated by the same procedures as in Example 10 except that the insulating collar 36 was formed of polyether ether ketone having a melting point of 334° C.

The secondary battery was dried in vacuum for a week in an oven at 60° C. to find no weight loss. No heat distortion was observed in the insulating collar 36.

Another box-shaped secondary battery was fabricated by the same procedures as in Example 10 except that the insulating collar 36 was formed of polypropylene having a melting point of 140° C. In this case, upon laser welding of the lid to the casing, the polypropylene was melted down and the positive terminal 37 fell down into the container 34 and contacted the lid 33 directly. A series of experiments were carried out to find laser welding conditions under which the polypropylene of the insulating collar did not melt. The laser welding conditions were: spot diameter 0.5 mm, laser output 1 Joule/pulse, frequency 5 pulses/sec., scanning speed 0.5 mm/sec., and overall output 5 watts. A long welding time of 96 seconds was required per the entire periphery of the casing opening 32.

EXAMPLE 12

Polyaniline was deposited on a working electrode or stainless steel mesh through electrolytic polymerization. In an acidic aqueous solution containing 1 mol/liter of aniline and 2 mol/liter of borofluoric acid ($HBF_4$) were disposed a working electrode in the form of a stainless steel mesh having an opening of 0.062 mm, a wire diameter of 50 μm, and an open area of 37% and a counter electrode of stailess steel. Electrolytic oxidative polymerization was carried out for 2.5 hours at a temperature of 15° C. by supplying constant current to the working electrode at a current density of 6 $mA/cm^2$. A polyaniline film deposited on the surface of the working electrode, obtaining a composite material of dimensions 200 mm by 34 mm by 1.1 mm thick in which the polyaniline film was tightly integrated with the working electrode. The composite material was washed with distilled water and then thoroughly dried.

A secondary battery of a cylindrical shape as shown in FIG. 2 was fabricated using the composite without further processing whereby the polyaniline film formed a positive electrode and the working electrode formed a positive collector. The negative electrode used was a lithium-aluminum alloy electrode which was prepared by sandwiching an aluminum plate of 180 mm by 34 mm by 200 μm (thick) between a lithium plate of 180 mm by 30 mm by 200 μm (thick) and another lithium plate of 140 mm by 30 mm by 200 μm (thick) under pressure following by alloying. A bag of porous polypropylene membrane serving as a separator was packed with the positive electrode. The positive and negative electrodes were rounded into a roll so that the outermost turn of the lithium-aluminum alloy negative electrode was exposed outside. The roll was placed in a bottomed cylindrical casing of SUS stainless steel having a diameter of 23 mm and a height of 43 mm.

An insulating collar was snugly fitted on a positive terminal in the form of a hollow vent tube having an axial bore with a diameter of 0.7 mm to form a positive electrode terminal assembly, which was engaged to an opening in a lid of SUS stainless steel. The lid was placed so as to close the top opening of the casing. The lid was sealed to the casing by YAG laser welding.

The cell container was evacuated to a vacuum of 1 mm Hg through the bore in the positive terminal assembly and then charged with 5.6 ml of an electrolytic solution of 3 mol/liter of $LiBF_4$ in a 1:1 (by volume) mixture of propylene carbonate and dimethoxyethane. The container was allowed to stand for 2 days or until no further generation of hydrogen gas was observed. A crown of SUS 316 stainless steel was fitted over the hollow vent tube through a protector of polypropylene and crimped around the circumference over an axial width of 1 mm (see FIGS. 3 and 4). The cylindrical lithium secondary cell was completed in this way. It is to be noted that all the above-mentioned operations were carried out under an inert atmosphere of argon gas.

The secondary battery was dried in vacuum for a week in an oven at 60° C. to find no weight loss.

The battery was subjected to an overcharging test causing abnormal gas generation. In the test, a voltage of 5 V was applied across the battery at room temperature for ten days. The weight of the battery was measured every day. The results are plotted in FIG. 10.

Figure 10:
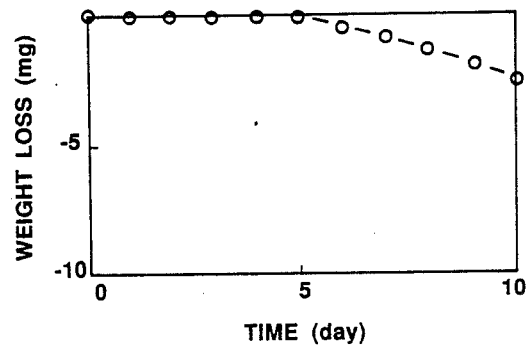
FIG. 10 is a diagram showing how the weight of the cell of Example 12 varies in an overcharging test.

FIG. 10 shows that a weight loss began on the sixth day of 5-volt application, indicating that gas gradually escaped from within the battery. A visual observation of the crimped crown showed that the crown was slightly loosened or flared outwardly, indicating that the gas generated under abnormal conditions was released through a gap under the flared portion.

Instead of fastening the crown, a compromise joint was mounted on the vent tube and connected to a pressure sensor capable of measuring a pressure in the range of from 0 to 35 kg/cm$^2$. The same overcharging test as above was carried out to determine a change of internal pressure. It was found that the internal pressure rose to about 20 kg/cm$^2$ on the sixth day of 5-volt application. It is thus understood that the vent mechanism in the form of a crimped crown operates at an internal pressure of about 20 kg/cm$^2$.

Separately, the battery was subjected to an overcharging test by applying a voltage of 6 and 8 volts. A weight loss began on the fifth day for 6-V application and the third day for 8-V application. In any case, the crown was not disengaged from the vent tube.

EXAMPLE 13

Figure 11:
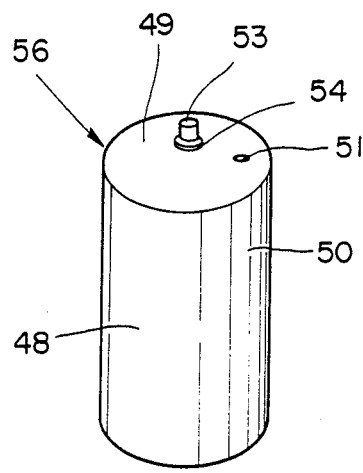
FIG. 11 is a perspective view showing the cell fabricated in Example 13.
Figure 12:
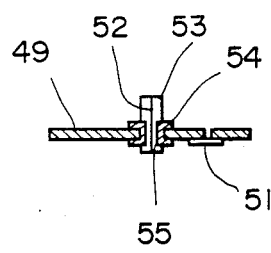
FIG. 12 shows a lid used in the cell of FIG. 11, FIG. 12A being a cross section and FIG. 12B being a plan view.
Figure 12:
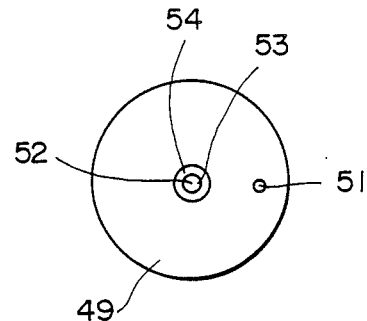

A cell container 50 was prepared which included a bottomed cylindrical casing 48 of stainless steel having a diameter of 23 mm and a height of 43 mm and a lid 49 of stainless steel having a diameter of 22 mm and a thickness of 0.3 mm as shown in FIGS. 11 and 12. In addition to a central opening 55, the lid 49 was perforated with a through hole having a diameter of 1.5 mm (area 1.8 mm$^2$). A stainless steel disc having a thickness of 0.003 mm was applied to the lower surface of the lid with an epoxy adhesive to form a thin-wall portion 51 which covers the hole.

The negative electrode used was a lithium-aluminum alloy electrode which was prepared by sandwiching an aluminum plate of 180 mm by 34 mm by 200 μm (thick) between a lithium plate of 180 mm by 30 mm by 200 μm (thick) and another lithium plate of 140 mm by 30 mm by 200 μm (thick) under pressure following by alloying. The positive electrode used was prepared by depositing polyaniline on a stanless steel mesh having an opening of 0.062 mm, a wire diameter of 50 μm, and an open are of 37% through electrolytic polymerization to form a composite of 1 mm thick and cutting out a strip of 200 mm by 34 mm from the composite. A bag of porous polypropylene membrane serving as a separator was packed with the positive electrode. The positive and negative electrodes were rounded into a roll so that the outermost turn of the lithium-aluminum alloy negative electrode was exposed outside. The roll was placed in the casing.

An insulating collar 54 was snugly fitted on a positive terminal in the form of a hollow tube 53 having an axial bore with a diameter of 0.7 mm to form a positive electrode terminal assembly, which was engaged to the central opening 55 in the lid 49. The lid 49 was placed so as to close the top opening of the casing 48. The lid 49 was sealed to the casing 48 by YAG laser welding.

The cell container 50 was evacuated to a vacuum of 1 mm Hg through the bore 52 in the positive terminal assembly and then charged with 5.6 ml of an electrolytic solution of 3 mol/liter of LiBF$_4$ in a 1:1 (by volume) mixture of propylene carbonate and dimethoxyethane. The container was allowed to stand for 2 days or until no further generation of hydrogen gas was observed. A stainless steel wire with a diameter of 0.7 mm and a length of 10 mm was inserted into the bore and laser welded to the bore. A cylindrical lithium secondary battery 56 was completed in this way. It is to be noted that all the above-mentioned operations were carried out under an inert atmosphere of argon gas.

The secondary battery was dried in vacuum for a week in an oven at 60° C. to find no weight loss.

The battery was subjected to an overcharging test causing abnormal gas generation. In the test, a voltage of 5 V was applied across the battery at room temperature for ten days. The weight of the battery was measured every day.

Figure 13:
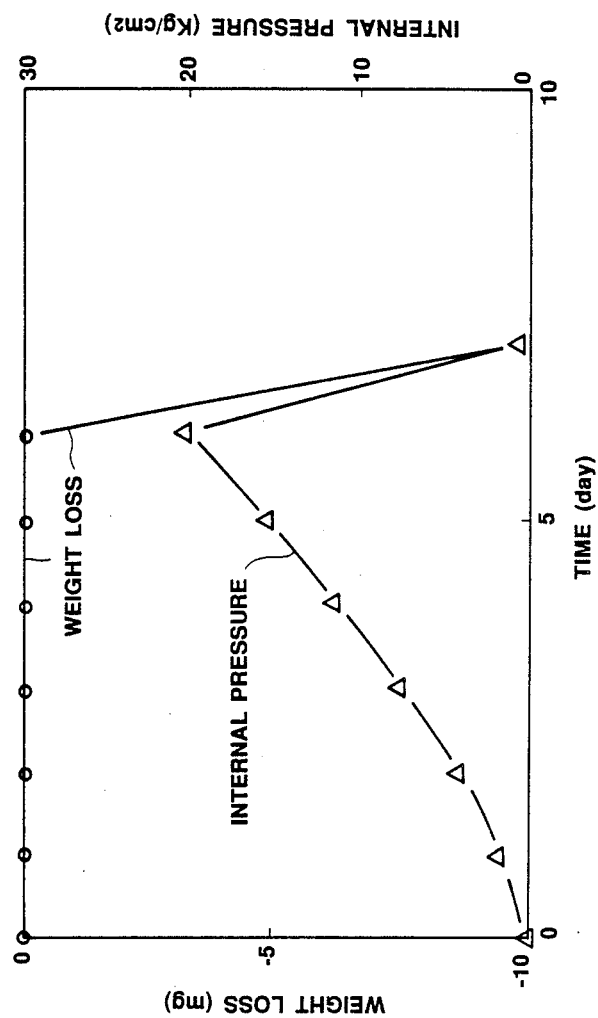
FIG. 13 is a diagram showing how the weight and internal pressure of the cell of Example 13 vary in an overcharging test.

Instead of inserting and welding the wire to the bore, a compromise joint was mounted on the positive terminal and connected to a pressure sensor capable of measuring a pressure in the range of from 0 to 35 kg/cm$^2$. The same overcharging test as above was carried out to determine the internal pressure as well as the weight loss. Changes of weight loss and internal pressure with time are shown in FIG. 13. It was found that a seal was maintained until the sixth day because no weight loss due to gas escape was observed. When the internal pressure rose to about 20 kg/cm$^2$, the thin-wall portion was ruptured to release the internal gas.

What is claimed is:

1. An electric cell comprising a positive electrode, a negative electrode, and an electrolyte, wherein said positive electrode is an electroconductive polymer composite including a mesh stainless steel having a wire diameter of about 35 to about 120 μm and an electroconductive polymer integrally deposited onto the mesh by electrolytic polymerization.

2. The cell of claim 1 wherein the electroconductive polymer is composed of polyaniline or a mixture of polyaniline and a derivative thereof.

3. The cell of claim 1 or 2 wherein the mesh stainless steel contains up to 10% by weight of nickel.

4. The cell of claim 1 or 2 wherein the mesh stainless steel has a plurality of openings of from about 0.05 to about 0.3 mm.

5. The cell of claim 1 or 2 wherein the mesh stainless steel has an open area of from about 30 to about 50%.

6. The cell of claim 1 or 2 wherein the negative electrode is prepared by bonding together under pressure
(A) a plate of pure lithium or a high lithium content lithium alloy, the content of lithium ranging from 100 to 80 mol %, and
(B) a plate of a lithium-free alloying metal or a low lithium content lithium alloy, the content of lithium ranging from 0 to 10 mol %, to form a laminate in which at least one plate is a lithium alloy plate,
immersing the laminate in an electrolytic solution comprising an organic solvent containing a lithium salt, thereby alloying lithium of component (A) to the alloying metal or lithium alloy of component (B) to form a lithium alloy electrode.

7. The cell of claim 1 which further comprises
a container which receives the positive electrode, the negative electrode, and the electrolyte therein, the container being provided with a vent,
a tubular vent member having an axial bore secured at one end to the vent in the container so that the bore is in communication with the interior of the container,
a crown having a cylindrical portion fitted on the vent member to cover the bore, the cylindrical portion of the crown being radially inwardly pressed along the circumference to form an annular crest which comes in close contact with the outer surface of the vent member with or without a protector interposed therebetween.

8. The cell of claim 1 which further comprises
a container which receives the positive electrode, the negative electrode, and the electrolyte therein, and
a thin wall portion provided in part of the container having an area of up to 20 mm$^2$, the thin-wall portion being breakable when the internal pressure rises beyond a predetermined level.

9. The cell of claim 1, 2, 7 or 8 which further comprises
a container which receives the positive electrode, the negative electrode, and the electrolyte therein, the container including a casing and a lid, the lid being sealed to the casing by laser welding.

10. The cell of claim 1 which is prepared by
sealing a lid to a casing having received therein the positive electrode and the negative electrode by laser welding, the lid being provided with a vent, admitting the electrolyte into the casing through the vent, and
inserting a sealing rod into the vent to seal the vent by laser welding.

11. The cell of claim 1, wherein said wire diameter is about 40 to about 100 μm.

12. The cell of claim 1, wherein said mesh stainless steel contains up to about 5% by weight of nickel.

* * * * *